(12) United States Patent
Choi

(10) Patent No.: US 11,517,107 B2
(45) Date of Patent: Dec. 6, 2022

(54) EXTENDABLE BAR TABLE FOR INSTALLING AT SUPPORTING POLES

(71) Applicant: Campvalley (Xiamen) Co., Ltd., Xiamen (CN)

(72) Inventor: Kwan Jun Choi, Xiamen (CN)

(73) Assignee: Campvalley (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 17/171,186

(22) Filed: Feb. 9, 2021

(65) Prior Publication Data

US 2021/0307505 A1 Oct. 7, 2021

(30) Foreign Application Priority Data

Apr. 2, 2020 (CN) .......................... 202020470430.0

(51) Int. Cl.
*A47B 37/04* (2006.01)
*F16B 2/12* (2006.01)
*A47B 83/04* (2006.01)
*A47B 3/083* (2006.01)

(52) U.S. Cl.
CPC .............. *A47B 37/04* (2013.01); *A47B 3/083* (2013.01); *A47B 83/04* (2013.01); *F16B 2/12* (2013.01)

(58) Field of Classification Search
CPC ......... A47B 37/04; A47B 3/083; A47B 83/04; F16B 2/12; F16B 2/065; F16B 2/10; F16B 2/185; A45B 2200/1063; A45B 2200/0008; A45B 3/00; A45B 3/083; A45B 23/00; A45B 37/04; A45B 83/04

USPC .... 108/50.12, 34, 35, 33, 38, 169, 167, 115, 108/132, 131, 129, 128, 80, 81, 42; 135/16, 117; 248/354.3

See application file for complete search history.

(56) References Cited

U.S. PATENT DOCUMENTS

| | | | |
|---|---|---|---|
| 627,100 A * | 6/1899 | Conn | |
| 1,063,642 A * | 6/1913 | Birdsall | A47B 1/08 108/36 |
| 1,211,829 A | 1/1917 | Eades | |
| 2,115,323 A * | 4/1938 | Wuest | B60N 3/007 108/149 |
| 2,743,979 A | 5/1956 | Shore | |
| 3,006,705 A | 10/1961 | Williams et al. | |
| 3,176,699 A | 4/1965 | Rollins | |
| 3,233,618 A | 2/1966 | Ferrier | |
| 3,246,611 A * | 4/1966 | Benlian | A47B 1/00 108/1 |

(Continued)

FOREIGN PATENT DOCUMENTS

| CN | 2471879 Y | 1/2002 |
|---|---|---|
| CN | 2840787 Y | 11/2006 |

(Continued)

*Primary Examiner* — Janet M Wilkens

(74) *Attorney, Agent, or Firm* — Morgan, Lewis & Bockius LLP

(57) ABSTRACT

A bar table includes a tabletop having one or more tabletop units. Each tabletop unit includes a panel and a frame coupled with the panel. At least one tabletop unit has a frame that is extendable beyond the panel of the same tabletop unit. The bar table also includes first and second connectors each for connecting the tabletop to a supporting pole. One or both of the first and second connectors are coupled with the extendable frame so that the bar table can be installed at the supporting poles of different distances.

20 Claims, 16 Drawing Sheets

(56) References Cited

U.S. PATENT DOCUMENTS

| | | | |
|---|---|---|---|
| 4,596,484 | A | 6/1986 | Nakatani |
| 4,744,690 | A | 5/1988 | Hsieh |
| 5,033,758 | A * | 7/1991 | Levy ................ B62B 3/02 |
| | | | 280/35 |
| 6,802,265 | B1 | 10/2004 | Dodson et al. |
| 6,866,054 | B1 | 3/2005 | Collins |
| 6,908,249 | B2 | 6/2005 | Tomm |
| 7,101,000 | B2 | 9/2006 | DeMars |
| 7,195,377 | B2 | 3/2007 | Tsai |
| 7,900,566 | B1 * | 3/2011 | Bunker .............. A47C 7/68 |
| | | | 108/42 |
| 8,272,605 | B2 | 9/2012 | Fuchs |
| 8,608,118 | B2 | 12/2013 | Lai |
| 8,832,910 | B2 | 9/2014 | Lah |
| 9,277,808 | B2 * | 3/2016 | Cai ................ A47B 3/087 |
| 2005/0126612 | A1 | 6/2005 | Chen |
| 2008/0105287 | A1 | 5/2008 | Huali et al. |
| 2013/0305965 | A1 | 11/2013 | Ramberg |
| 2015/0296975 | A1 * | 10/2015 | Choi ................ E04H 15/02 |
| | | | 108/50.12 |

FOREIGN PATENT DOCUMENTS

| CN | 202319053 | * | 9/2012 |
|---|---|---|---|
| DE | 102014013073 | * | 3/2016 |

* cited by examiner

EXTENDABLE BAR TABLE FOR INSTALLING AT SUPPORTING POLES

CROSS-REFERENCE TO RELATED APPLICATIONS

The present application claims priority to Chinese Utility Model Application CN 202020470430.0 filed Apr. 2, 2020. The disclosure of each application is incorporated herein for all purposes by reference in its entirety.

FIELD OF THE INVENTION

The present invention generally relates to bar tables and, in particular, to extendable bar tables for installing at supporting poles.

BACKGROUND

Most existing tents or awnings are foldable and are easy to carry around. However, many of them are not equipped with a bar. As such, if a drink is desired, the drink is usually placed on a table, which often occupies a large space and thus reduces the effective use of the tent or awning. A few existing tents have a bar countertop, but the bar countertop is usually fixed with the tent and in some cases is welded directly on the tent frame. As such, the bar countertop cannot be separated from the tent. Accordingly, the tent together with the bar countertop takes up a large space and is inconvenient for transportation and storage. Moreover, the bar countertop cannot be installed at other tents, let alone other tents of different sizes. In addition, the bar countertop cannot be adjusted in height to meet different needs or preferences.

Given the current state of the art, there remains a need for bar tables that address the abovementioned issues.

The information disclosed in this Background section is provided for an understanding of the general background of the invention and is not an acknowledgment or suggestion that this information forms part of the prior art already known to a person skilled in the art.

SUMMARY OF THE INVENTION

The present disclosure provides bar tables that can be installed at supporting poles of different distances, foldable and/or adjustable in height.

In various exemplary embodiments, the present disclosure provides a bar table that can be installed at first and second supporting poles spaced apart from each other. The bar table includes first and second tabletop units coupled with each other at their proximal sides. The first tabletop unit comprises a first panel and a first frame coupled with the first panel, and the second tabletop unit comprises a second panel and a second frame coupled with the second panel. The first frame includes a first mounting member coupled with the first panel, and a first extension coupled with the first mounting member and movable along a first direction to extend the first frame beyond a distal edge of the first panel. The bar table also includes a leg assembly coupled with the first and second tabletop units to support the first and second tabletop units when in use. The bar table further includes first and second connectors. The first connector is coupled with the first frame at a distal side of the first tabletop unit and configured to be selectively fastened at the first supporting pole. The second connector is coupled with the second frame at a distal side of the second tabletop unit and configured to be selectively fastened at the second supporting pole. In particular, the first connector is coupled with the first extension of the first frame, thereby allowing the bar table to be installed at the first and second supporting poles of different distances.

In some exemplary embodiments, the second frame includes a second mounting member coupled with the second panel, and a second extension coupled with the second mounting member and movable along the first direction to extend the second frame beyond a distal edge of the second panel. The second connector is coupled with the second extension of the second frame, thereby allowing the bar table to be installed at the first and second supporting poles of different distances.

In an exemplary embodiment, the first and second supporting poles are components of a tent, an awning, a canopy, or a gazebo.

In some exemplary embodiments, the first and second tabletop units are pivotally connected to each other at their proximal sides and the leg assembly is pivotally connected to the first and second tabletop units at the proximal sides of the first and second tabletop units such that when folded, the leg assembly is sandwiched in between the first and second tabletop units.

In an exemplary embodiment, a clip is disposed at the first frame and includes an opening to grip cross-section-wise a bar of the second frame when the bar table is folded.

In some exemplary embodiments, the first and second tabletop units are substantially the same.

In some exemplary embodiments, the leg assembly is adjustable in height.

In some exemplary embodiments, the first and second connectors are substantially the same.

In some exemplary embodiments, the first mounting member includes first and second bars each elongated along the first direction. The first extension includes a "U" shaped bar having a first side segment, a second side segment and a closed end segment connected to or integrally formed with the first and second side segments. The first side segment is telescopically coupled with the first bar, the second side segment is telescopically coupled with the second bar, and the first connector is coupled with the closed end segment.

In an exemplary embodiment, a first mounting bracket is provided to couple the first bar of the first mounting member with the first panel and to prevent complete disengagement of the first side segment of the first extension from the first bar, and a second mounting bracket is provided to couple the second bar of the first mounting member with the first panel and to prevent complete disengagement of the second side segment of the first extension from the second bar.

In some exemplary embodiments, the first connector includes first and second connecting members. The first connecting member is coupled with the first frame. The second connecting member is pivotally coupled with the first connecting member and rotatable with respect to the first connecting member in a second direction. When the second connecting member is in a loosen state with respect to the first connecting member, the first and second connecting members collectively form an opening to allow cross-section-wise insertion of the first supporting pole into the first connector and a slot to receive cross-section-wise the first supporting pole. When the second connecting member is in a locking state with respect to the first connecting member, the first and second connecting members collectively form an enclosure that encloses cross-section-wise the first supporting pole.

In some exemplary embodiments, the first connector further includes a fastener coupled with the first or second connecting member and configured to prevent movement of the first supporting pole within the enclosure formed by the first and second connecting members.

In an exemplary embodiment, the second direction is perpendicular to the first direction.

In some exemplary embodiments, one of the first and second connecting members includes a protrusion, and the other of the first and second connecting members includes a buckle to engage with the protrusion, thereby locking the second connecting member with respect to the first connecting member.

In an exemplary embodiment, the second connecting member includes a protrusion. The first connecting member includes a main body and a buckle. The main body is coupled with the first frame and the second connecting member. The buckle is pivotally coupled with the main body and rotatable with respect to the main body in the second direction to engage with the protrusion of the second connecting member, thereby locking the second connecting member with respect to the first connecting member.

In some exemplary embodiments, the enclosure includes one or more outwardly convex corners to receive one or more corners of the first supporting pole.

In an exemplary embodiment, a corner in the one or more outwardly convex corners has a substantially triangular shape.

In some exemplary embodiments, the bar table includes a handle disposed at the first or second frame.

In various exemplary embodiments, the present disclosure provides a bar table that can be installed at first and second supporting poles spaced apart from each other. The bar table includes a tabletop, a first connector and a second connector. The tabletop includes one or more tabletop units, each including a panel and a frame coupled with the panel. The frame of a first tabletop unit in the one or more tabletop units is extendable in a first direction beyond an edge of the first panel. Each of the first and second connectors includes first and second connecting members. The first connecting member is coupled with the frame of a tabletop unit in the one or more tabletop units and the second connecting member is pivotally coupled with the first connecting member and rotatable with respect to the first connecting member in a second direction. When the second connecting member is in a loosen state with respect to the first connecting member, the first and second connecting members collectively form an opening to allow cross-section-wise insertion of the first or second supporting pole and a slot to receive cross-section-wise the first or second supporting pole. When the second connecting member is in a locking state with respect to the first connecting member, the first and second connecting members collectively form an enclosure that encloses cross-section-wise the first or second supporting pole. At least one of the first connecting member of the first connector and the first connecting member of the second connector is coupled with the extendable frame of the first tabletop unit, thereby allowing the bar table to be installed at the first and second supporting poles of different distances.

In some exemplary embodiments, the bar table further includes a leg assembly coupled with the tabletop, and the leg assembly is adjustable in height.

The bar tables of the present disclosure have other features and advantages that will be apparent from, or are set forth in more detail in, the accompanying drawings, which are incorporated herein, and the following Detailed Description, which together serve to explain certain principles of exemplary embodiments of the present disclosure.

BRIEF DESCRIPTION OF THE DRAWINGS

The accompanying drawings, which are incorporated into and constitute a part of this specification, illustrate one or more exemplary embodiments of the present disclosure and, together with the Detailed Description, serve to explain the principles and implementations of exemplary embodiments of the invention.

Figure 1:
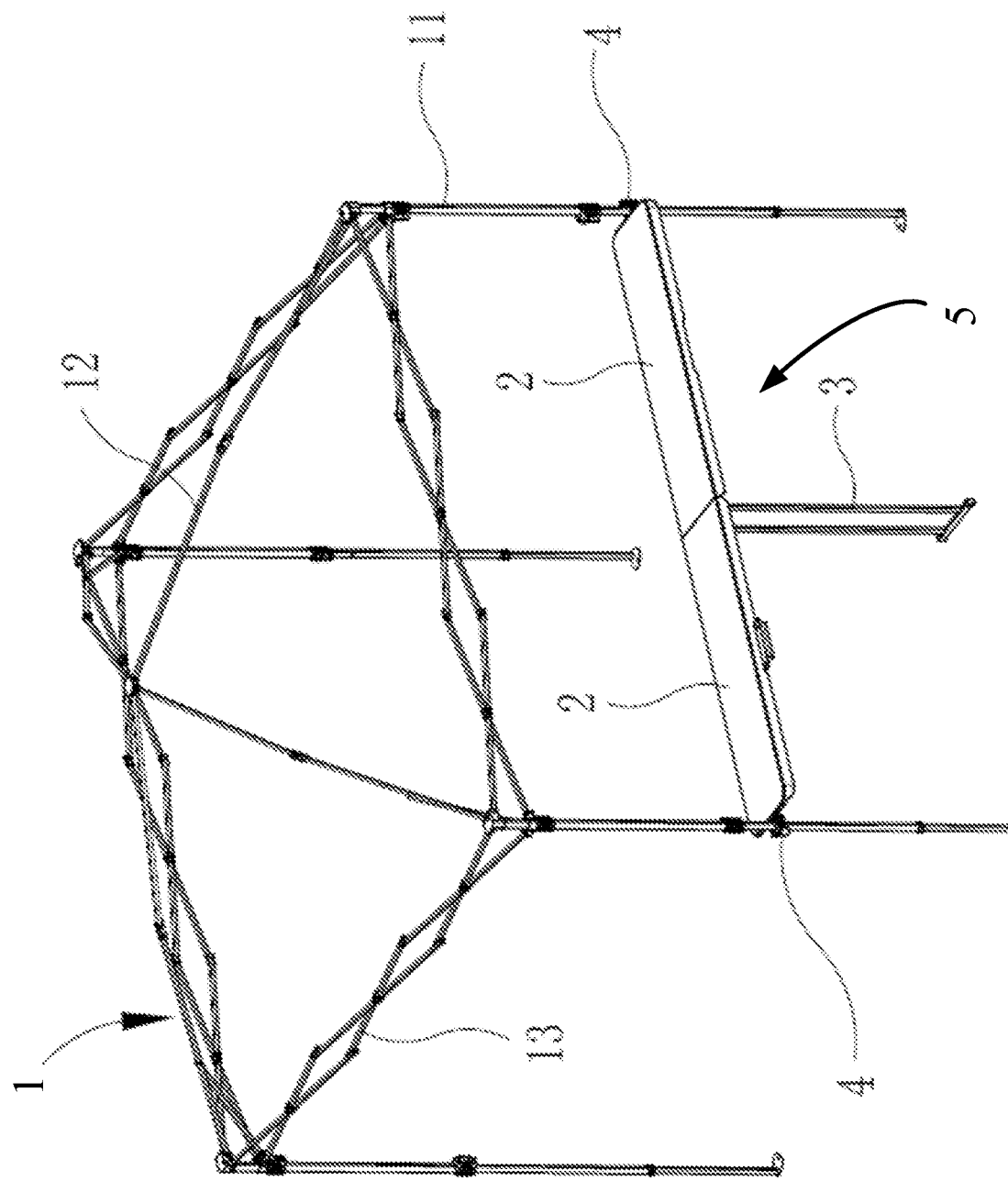
FIG. 1 is a perspective view illustrating an exemplary bar table installed at a tent where adjacent supporting poles are at a first distance in accordance with exemplary embodiments of the present disclosure.

As will be apparent to those of skill in the art, the components illustrated in the figures described above are combinable in any useful number and combination. The figures are intended to be illustrative in nature and are not limiting.

DETAILED DESCRIPTION

Reference will now be made in detail to implementation of exemplary embodiments of the present disclosure as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present disclosure will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the exemplary embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present disclosure are described in the context of bar tables that can be installed at various structures with two or more poles or at a structure where the distances between poles can vary. A bar table of the present disclosure generally includes a tabletop, and first and second connectors each for connecting the tabletop to a pole or the like. The tabletop can include one, two, three or more tabletop units connected to each other. Each tabletop unit includes a panel and a frame disposed at a lower side of the panel and coupled with the panel. Among the one or more tabletop units, at least one tabletop unit has the frame extendable in a first direction (e.g., the longitudinal direction) of the bar table and can be extended beyond an edge (e.g., a far end edge) of the corresponding panel. One or more of the first and second connectors are connected with the extendable frame. Thus, by extending or contracting the extendable frame, the bar table of the present disclosure can be installed at various structures with poles at different distances or at a structure where distances between poles can vary.

In some exemplary embodiments, the tabletop includes two or more tabletop units pivotally connected to each other such that the tabletop units can be folded onto each other. As such, when folded, the bar table of the present disclosure is compact and thus convenient for storage and transportation.

In some exemplary embodiments, a leg assembly is provided to support the tabletop when the bar table is in use. The leg assembly can be adjustable or non-adjustable in height. With an adjustable leg assembly, the bar table of the present disclosure can be placed at different heights to meet different needs.

A panel can be made of various materials including but not limited to metals, plastics and woods. In some exemplary embodiments, a panel is made of plastics by injection molding, blow molding or any other suitable processes. Similarly, a frame or a leg assembly of the present disclosure can be made of various materials including but not limited to metals (e.g., iron, steel, and aluminum) and plastics. In some exemplary embodiments, some components of the frame or leg assembly (e.g., bars) are made of metals or the like while some other components (e.g., couplers, clips) are made of plastics, rubbers or the like.

Figure 2:
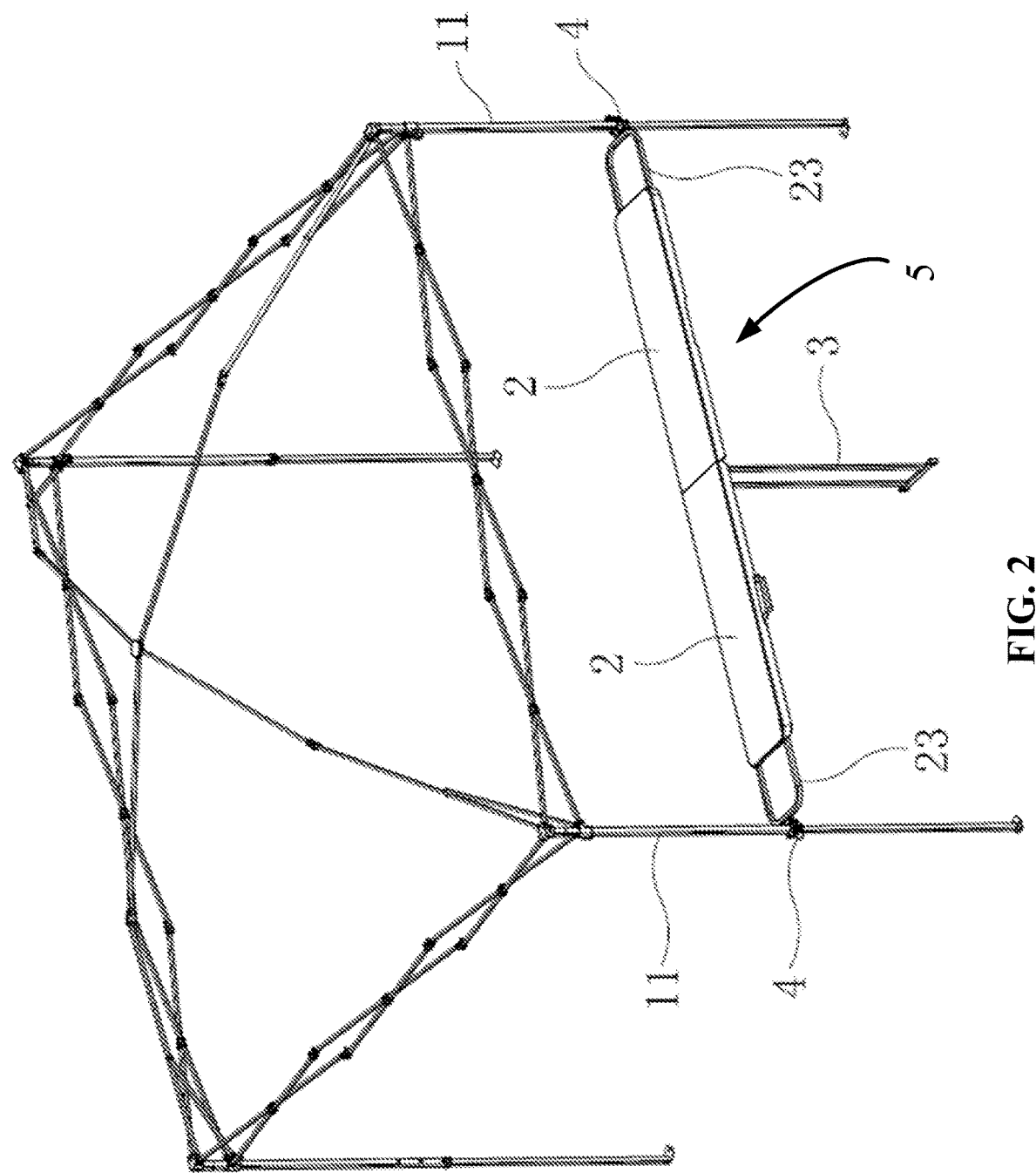
FIG. 2 is a perspective view illustrating the exemplary bar table of FIG. 1 installed at the tent where adjacent supporting poles are at a second distance in accordance with exemplary embodiments of the present disclosure.

Referring now to FIGS. 1 and 2, there is depicted exemplary bar table 5 installed at tent 1 in accordance with some exemplary embodiments of the present disclosure. Tent 1 includes a plurality of supporting poles 11, a plurality of upper pole units 12 and a plurality of side pole units 13. The plurality of upper pole units and the plurality of side pole units are coupled with the plurality of supporting poles such that the supporting poles can be placed at different distances depending on personal preferences and/or available spaces. For instance, supporting poles 11 in FIG. 2 are spaced apart at a distance different than that of supporting poles 11 in FIG. 1. By extending or contracting the at least one extendable frame, bar table 5 of the present disclosure can be easily connected to two supporting poles 11 of tent 1 at any suitable distance. The supporting poles can be adjustable or non-adjustable in height.

While FIGS. 1 and 2 illustrate installation of the exemplary bar table at a tent, it should be noted that a bar table of the present disclosure can be installed at any suitable structures as long as there are two poles or the like. Examples of suitable structures include but are not limited to tents, awnings, canopies and gazebos. It should also be noted that a structure can have any suitable number of poles or the like, including but not limited to two, three, four, or more than four poles or the like and that distances between poles can vary or be fixed. It should further be noted that a bar table of the present disclosure can be installed at two adjacent poles or two nonadjacent poles. For instance, a bar table of the present disclosure can be installed at two diagonal or opposite poles. In addition, it should be noted that a "pole" or a "supporting pole" can be flexible or rigid, can be curved or straight, can be long or short, and can have regular or irregular cross sections.

In various exemplary embodiments, a bar table of the present disclosure includes a tabletop, and first and second connectors each for connecting the tabletop to a supporting pole or the like. For instance, by way of example, FIGS. 1 and 2 illustrate bar table with a tabletop composed of two tabletop units 2 and two connectors 4 each for connecting the tabletop to supporting pole 11. In some exemplary embodiments, a bar table of the present disclosure also includes a leg assembly such as leg assembly 3 to support the tabletop when the bar table is in use.

While two tabletop units are illustrated, it should be noted that a tabletop can be composed of any suitable number of tabletop units including but not limited to one, two, three or more tabletop units. For instance, in an exemplary embodiment, a tabletop is composed of a single tabletop unit. In such an embodiment, the frame of the single tabletop unit is extendable and both connectors are disposed at the extendable frame of the single tabletop unit. In another exemplary embodiment, a tabletop is composed of two, three, four or more tabletop units. While the two tabletop units are illustrated to be substantially the same, it should be noted that the two tabletop units can be but do not have to be substantially the same. They can be different from each other in shapes, sizes, materials, constructions (e.g., whether or not the frame is extendable) or in any other configuration parameters. For instance, in an exemplary embodiment, a frame of one tabletop unit is extendable and a frame of another tabletop unit is non-extendable or extendable in a different direction. In addition, while the two connectors are illustrated to be substantially the same, it should be noted that the two connectors can be but do not have to be substantially the same. They can be different from each other in shapes, sizes, materials, constructions or in any other configuration parameters.

Figure 3:
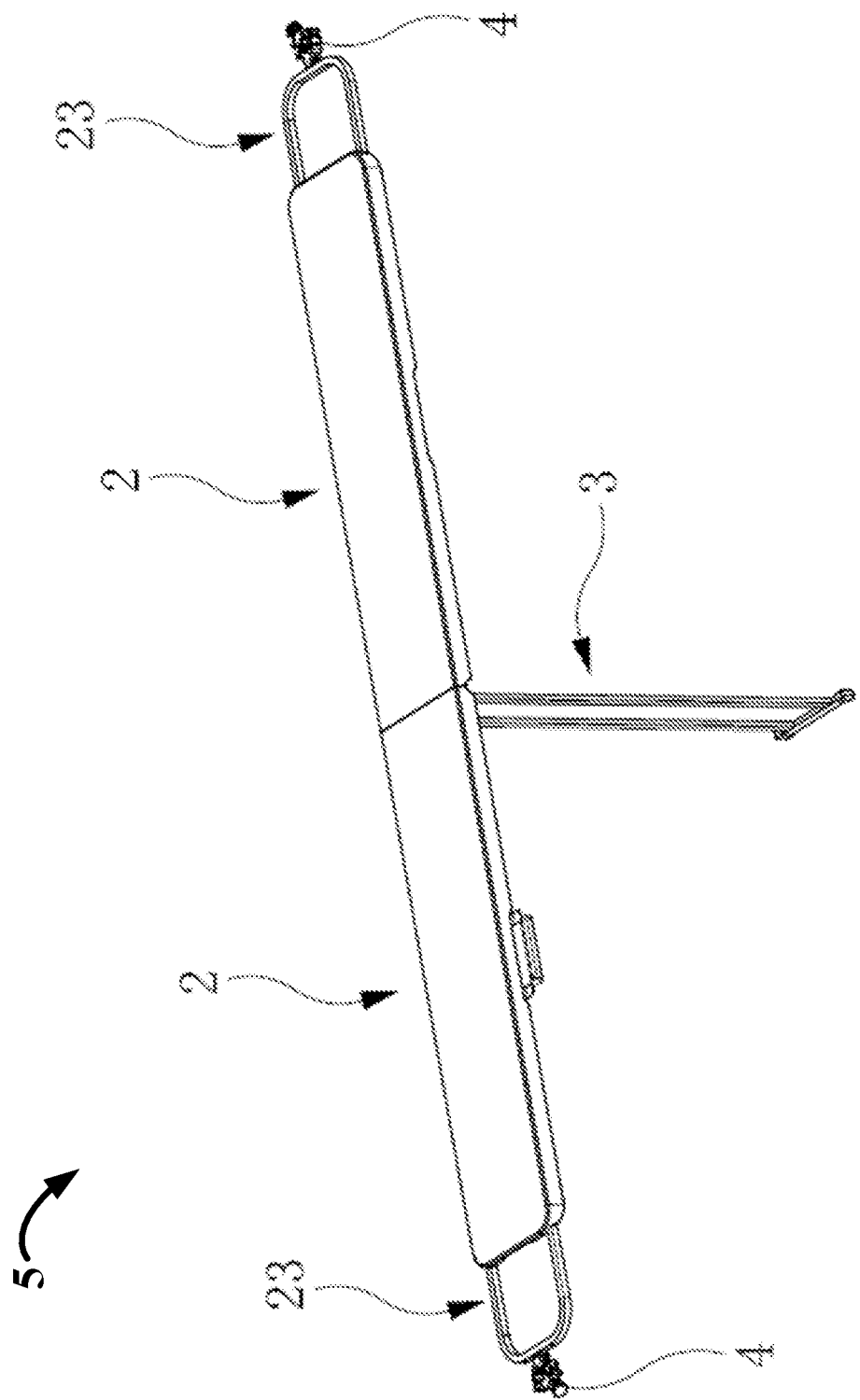
FIG. 3 is a perspective view illustrating an exemplary bar table in accordance with exemplary embodiments of the present disclosure.
Figure 4:
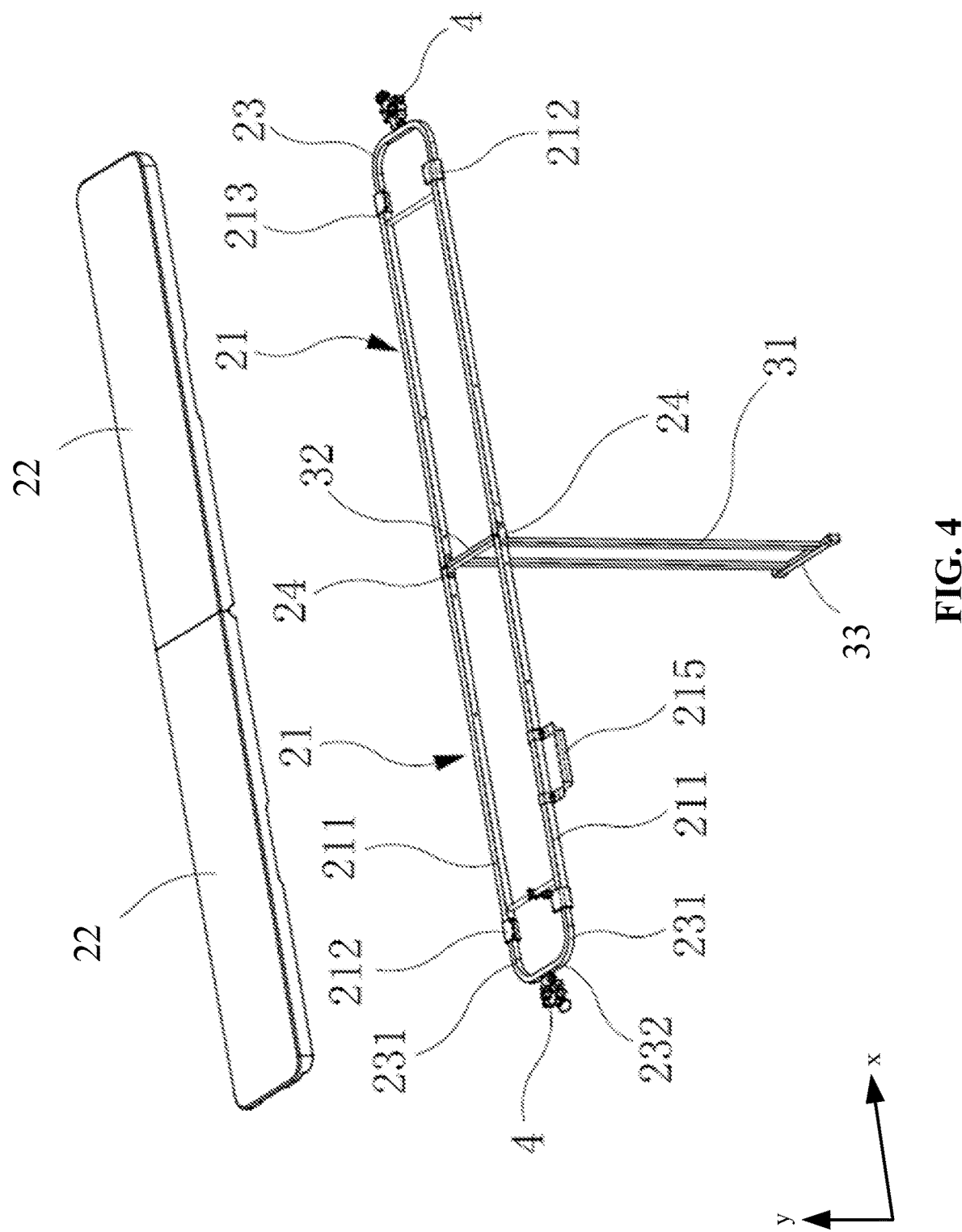
FIG. 4 is a partially disassembled view illustrating the exemplary bar table of FIG. 3 in accordance with exemplary embodiments of the present disclosure.

Referring to FIGS. 3-4, in some exemplary embodiments, tabletop unit 2 includes a panel such as panel 22 and a frame such as frame 21 disposed at a lower side of the panel and formed or coupled with the panel. While a panel of a substantially rectangular shape is illustrated, it should be noted that a panel can be of various shapes including but not limited to a square shape, a round shape or a rectangular shape.

Frame 21 includes a mounting member coupled with the panel and an extension coupled with the mounting member and movable along a first direction to extend the frame beyond a distal edge of the panel. For instance, in some exemplary embodiments, frame 21 including a mounting member composed of a pair of bars 211 that is substantially parallel to each other. Each bar 211 is elongated along the first direction (e.g., the x-direction in FIG. 4) and coupled with panel 22, for instance, by a mounting bracket such as mounting bracket 212. Frame 21 also includes an extension such as extension 23 movable coupled with bars 211. For instance, in some exemplary embodiments, extension 23 includes two side segments, such as side segment 231, each telescopically coupled with bar 211. As such, extension 23 is movable along the first direction with respect to bars 21 and accordingly is movable along the first direction with respect to panel 22. In an exemplary embodiment, mounting bracket 212 that couples bar 211 with panel 22 also includes a stopper to prevent complete disengagement of side segment 231 of extension 23 from bar 211.

In its extended position, the frame extends beyond the panel of the same tabletop unit. For instance, as illustrated in FIGS. 3 and 4, frame 21 of tabletop unit 2 at the left side of the figures extends to the left side beyond the far left side edge (a distal edge) of panel 22 of tabletop unit 2 at the left side of the figures. Similarly, frame 21 of tabletop unit 2 at the right side of the figures extends to the right side beyond the far right side edge (a distal edge) of panel 22 of tabletop unit 2 at the right side of the figures. In some exemplary embodiments, extension 23 also includes a closed end segment, such as closed end segment 232. The closed end segment is connected to or integrally formed with the two side segments and forms collectively with the two side segment a "U" shaped bar.

Referring to FIGS. 6A-7D, in some exemplary embodiments, connector 4 is disposed at extension 23 of the frame. As such, by extending or contracting the extension of the frame, one can adjust the distance between the first and second connectors in accordance with the distance of the two supporting poles intended for installation of the bar table and then connect the bar table to the two supporting poles. In other words, with one or more extendable frame(s), the bar table of the present disclosure can be installed at various structures even though the first and second supporting poles of different structures are spaced apart at different distances or at a structure where the distance between the first and second supporting poles can vary.

In some exemplary embodiments, connector 4 includes a first connecting member such as first connecting member 42 and a second connecting member such as second connecting member 44. The first connecting member is coupled with closed end segment 232 of extension 23 of the frame, for instance, by a bracket or the like. The second connecting member is pivotally coupled with the first connecting member and rotatable with respect to the first connecting member in a second direction, e.g., the y-direction in FIG. 6A. In an exemplary embodiment, the second direction is substantially perpendicular to the first direction.

Figure 6A:
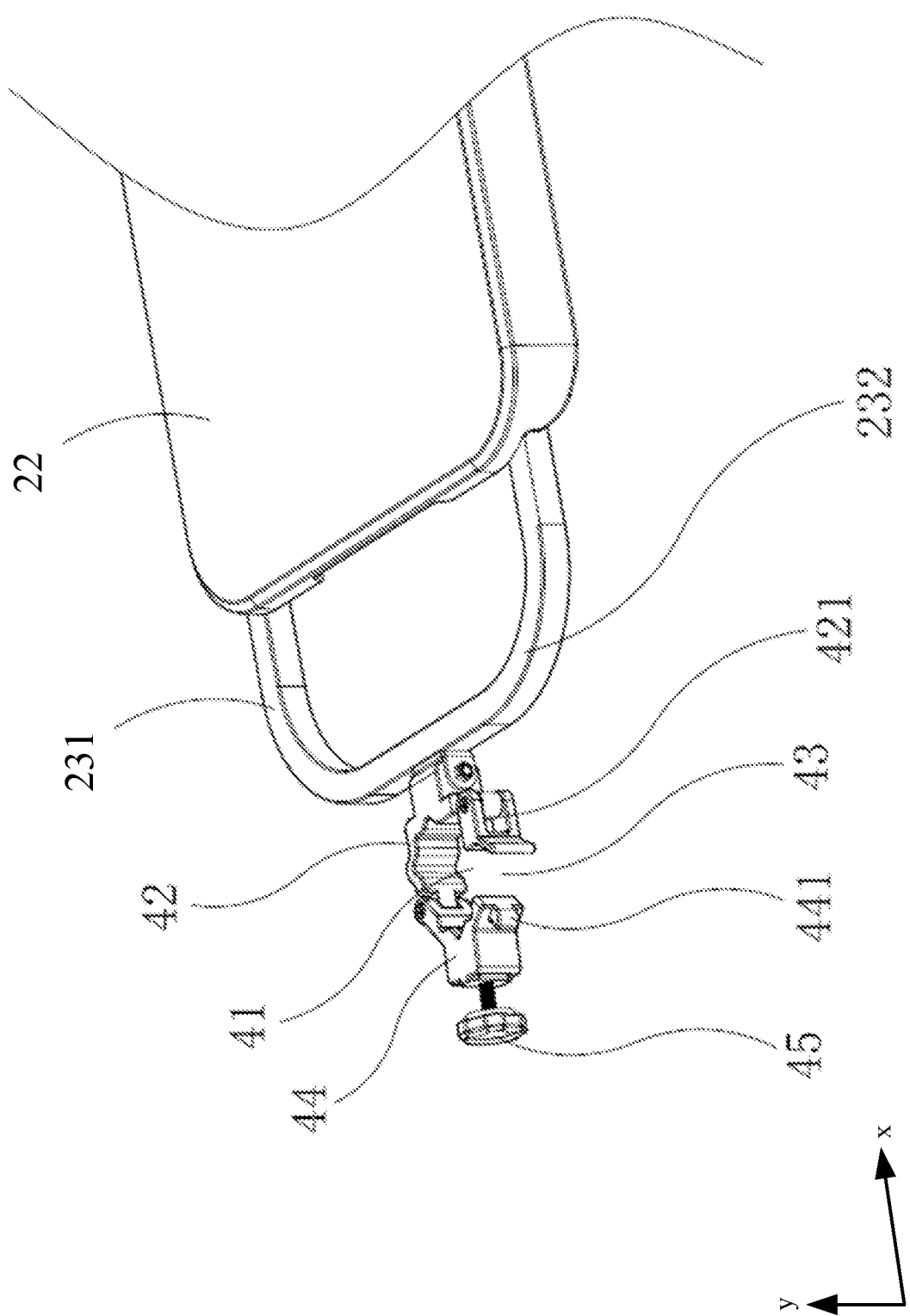
FIG. 6A is a perspective view illustrating a connector in accordance with exemplary embodiments of the present disclosure.
Figure 6B:
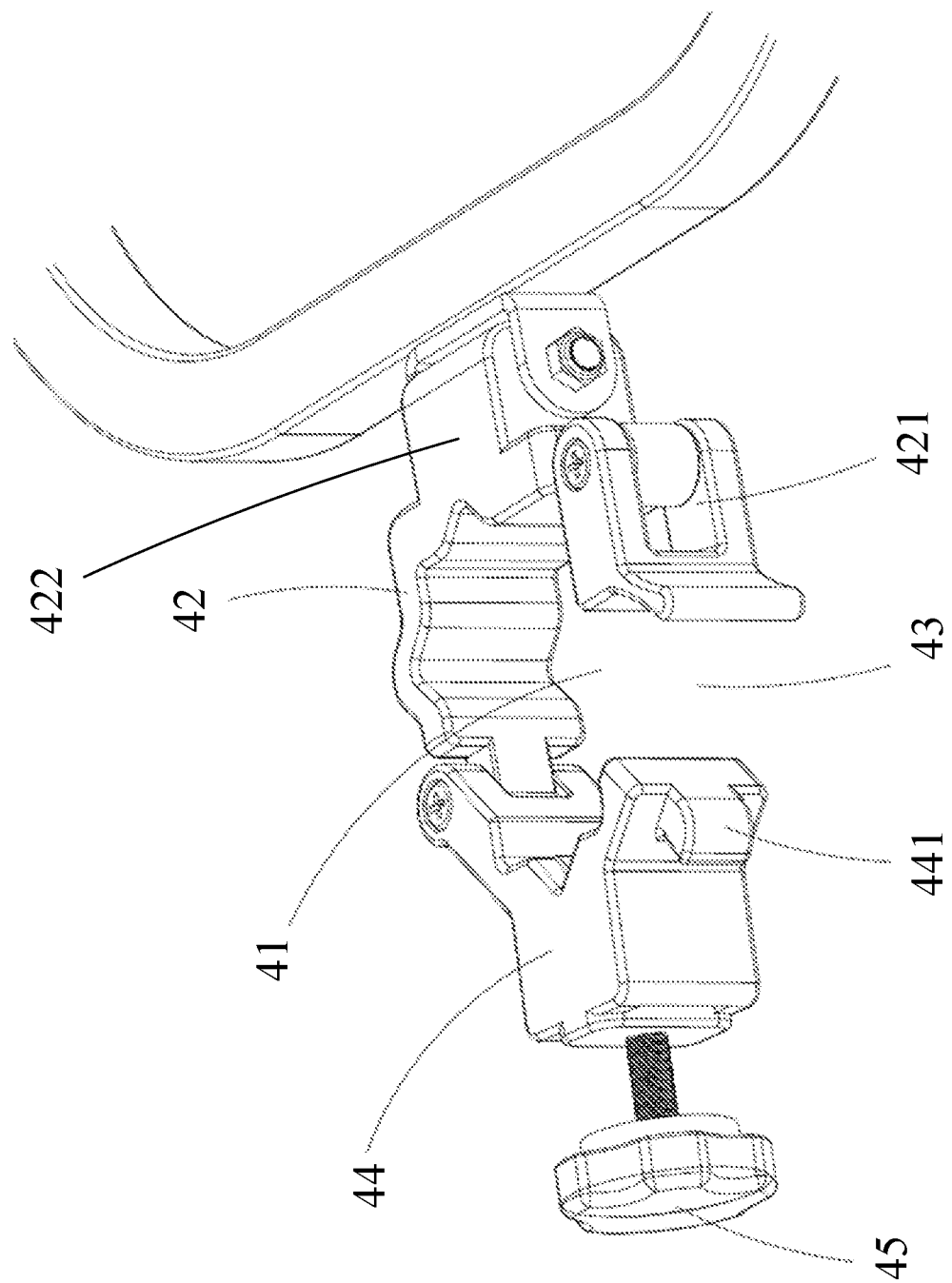
FIG. 6B is a partially enlarged view of FIG. 6A.
Figure 7A:
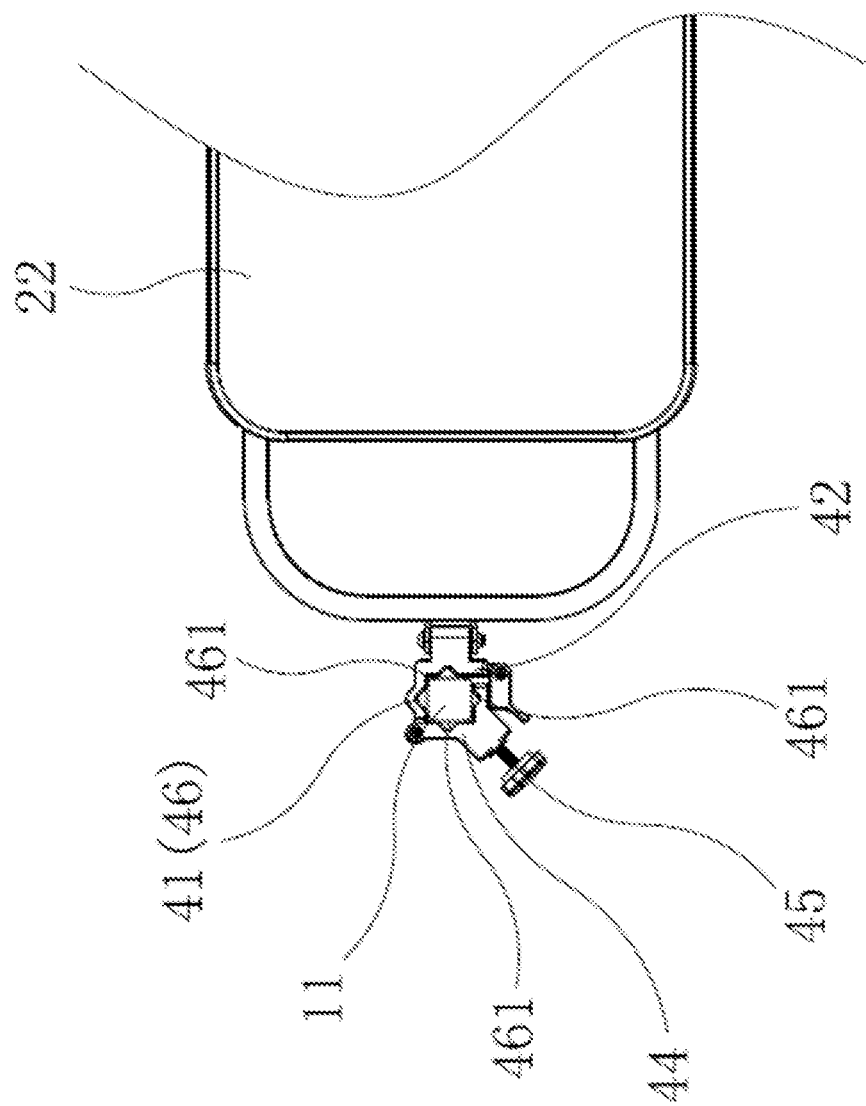
FIG. 7A is a cutout view illustrating a connector and a pole in a first state in accordance with exemplary embodiments of the present disclosure.
Figure 7B:
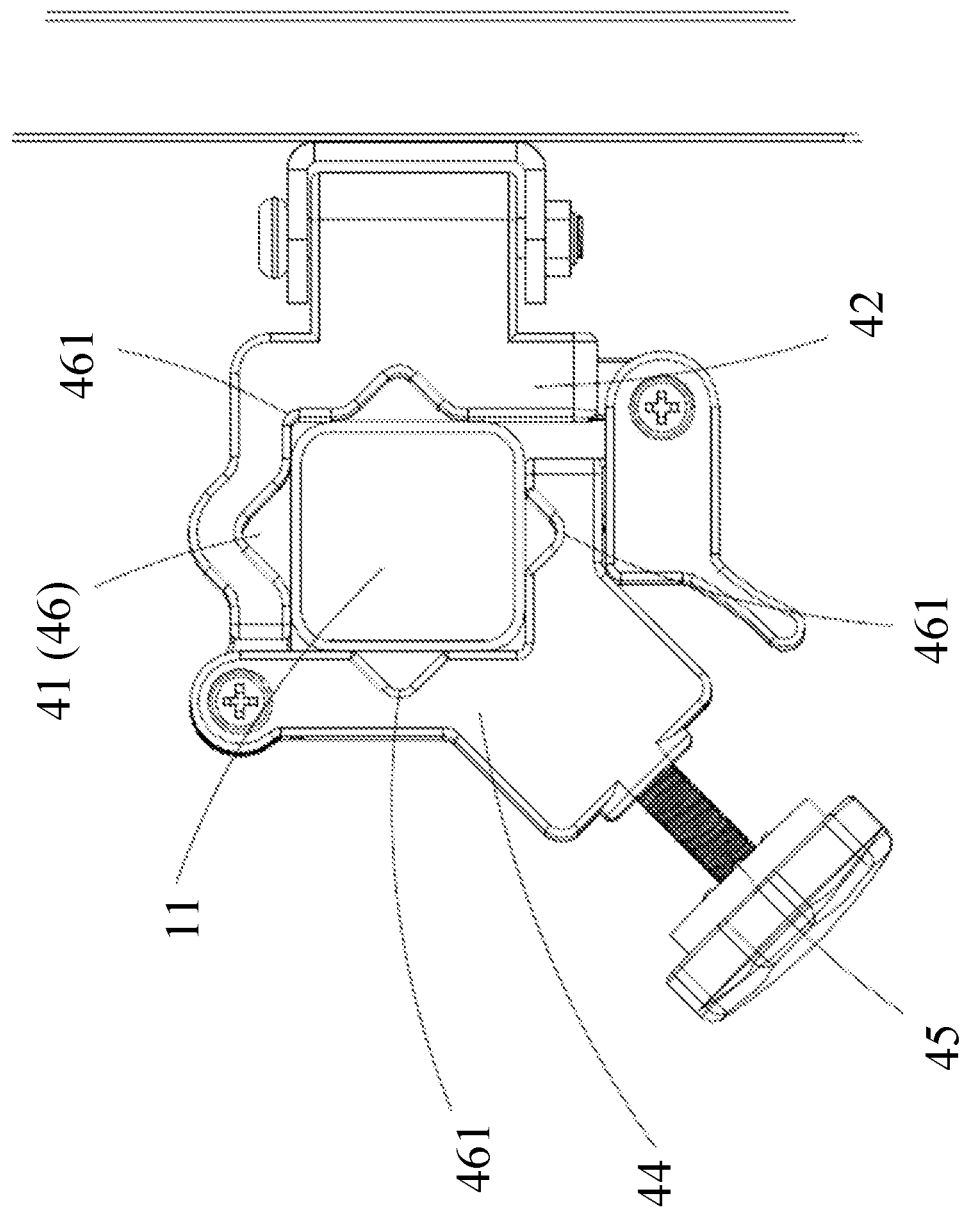
FIG. 7B is a partially enlarged view of FIG. 7A.
Figure 7C:
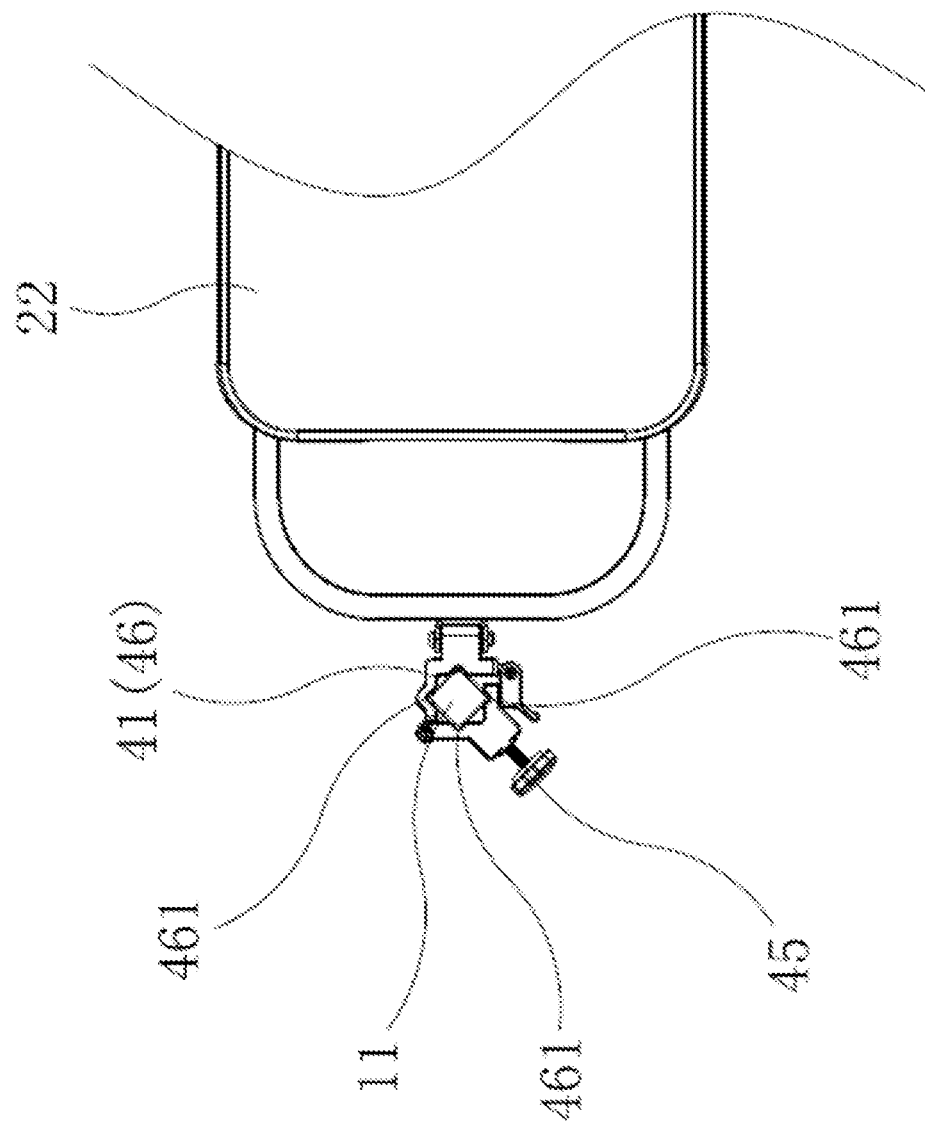
FIG. 7C is a cutout view illustrating a connector and a pole in a second state in accordance with exemplary embodiments of the present disclosure.
Figure 7D:
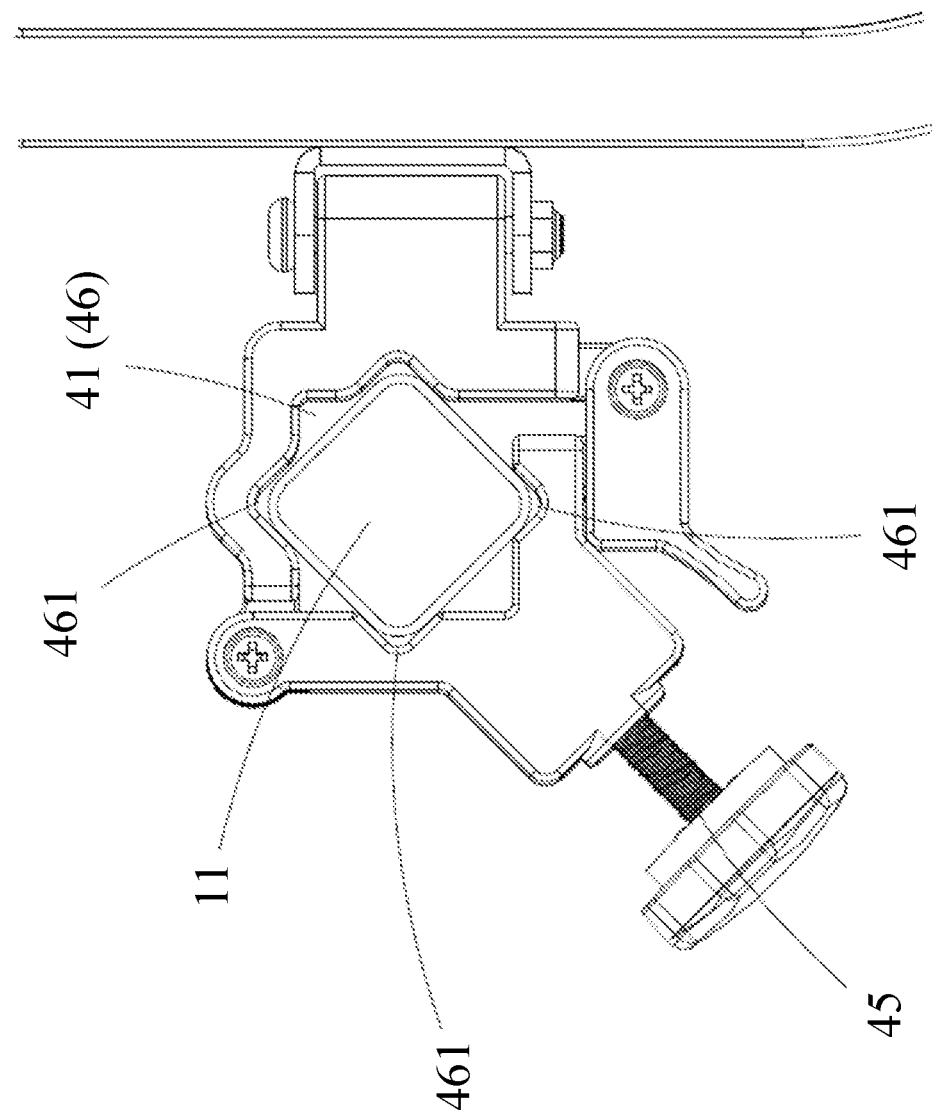
FIG. 7D is a partially enlarged view of FIG. 7C.

When the second connecting member is in a loosen state with respect to the first connecting member as illustrated in FIGS. 6A-6B, the first and second connecting members collectively form an opening such as opening 43 to allow cross-section-wise insertion of a supporting pole into the connector and a slot such as slot 41 to receive cross-section-wise the supporting pole. When the second connecting member is in a locking state with respect to the first connecting member as illustrated in FIGS. 7A-7D, the first and second connecting members collectively form an enclosure such as enclosure 46 that encloses cross-section-wise the supporting pole.

In some exemplary embodiments, one of the first and second connecting members includes a protrusion, and the other of the first and second connecting members includes a buckle to engage with the protrusion, thereby locking the second connecting member with respect to the first connecting member. For instance, by way of example, FIGS. 6A and 6B illustrate the second connecting member including a protrusion such as protrusion 441 and the first connecting member including a buckle such as buckle 421. Buckle 421 is configured to engage with protrusion 441 and lock the second connecting member with respect to the first connecting member. In an exemplary embodiment, the first connecting member includes a main body such as main body 422 coupled with the frame (e.g., coupled with closed end segment 232 of extension 23 of the frame) and the second connecting member. Buckle 421 is pivotally coupled with the main body and rotatable with respect to the main body in the second direction to engage with the protrusion of the second connecting member. In some exemplary embodiments, the protrusion is configured with a guiding surface to facilitate easy engagement of the protrusion with the buckle or disengagement of the protrusion from the buckle.

In some exemplary embodiments, connector 4 include a fastener coupled with the first or second connecting member to prevent movement of the supporting pole within the enclosure formed by the first and second connecting members. For instance, in an exemplary embodiment, fastener 45 (e.g., a bolt or the like) is coupled with the second connecting member and has an access to slot 41 through the second connecting member. When a supporting pole is received in slot 41 or enclosure 46, rotating or pushing the fastener toward the slot or enclosure helps tightening the supporting pole within the slot or enclosure of the connector. With the help of the fastener, the connector can be secured at supporting poles with different nominal diameters.

In some exemplary embodiments, enclosure 46 includes one or more outwardly convex corners such as corner 461. Corner 461 can have any suitable shapes and sizes. In an exemplary embodiment, corner 461 has a substantially triangular shape. Corner 461 can be formed at either the first or second connecting member, for instance, by forming a notch or a recess at the interior wall of the first or second connecting member. In an exemplary embodiment, enclosure 46 includes two, three, four or more outwardly convex corners distributed evenly or unevenly around the perimeter of the enclosure. As such, for a supporting pole with a non-circular cross-section (e.g., polygonal cross-section), one or more periphery corners of the supporting pole can be fitted into the outwardly convex corners of the enclosure. This restricts the movement (e.g., shaking) of the supporting pole within the enclosure. Moreover, with the one or more outwardly convex corners, the connector can be used to connect the tabletop to supporting poles at different angles, e.g., a supporting pole can be vertical or oblique with respect to the ground.

Referring to FIGS. 3-4 and 8-9, in some exemplary embodiments, two adjacent tabletop units are pivotally connected to each other at their proximal sides such that the tabletop units can be folded onto each other. For instance, in some exemplary embodiments, bar 211 of the frame of one tabletop unit is pivotally coupled with bar 211 of the frame of another tabletop unit by pivoting coupler 24.

In some exemplary embodiments, leg assembly 3 is pivotally connected to the two tabletop units at the proximal sides of the tabletop units such that when folded, the leg assembly is sandwiched in between the two tabletop units. For instance, in an exemplary embodiment, leg assembly 3 includes an upper bar such as upper bar 32, one or more legs such as leg 31 and a lower bar such as lower bar 33. Upper bar 23 is disposed between the two pivoting couplers and each of its end portions is connected to one pivoting coupler. Leg 31 has an upper end portion connected to the upper bar and a lower end portion connected to the lower bar.

Figure 10:
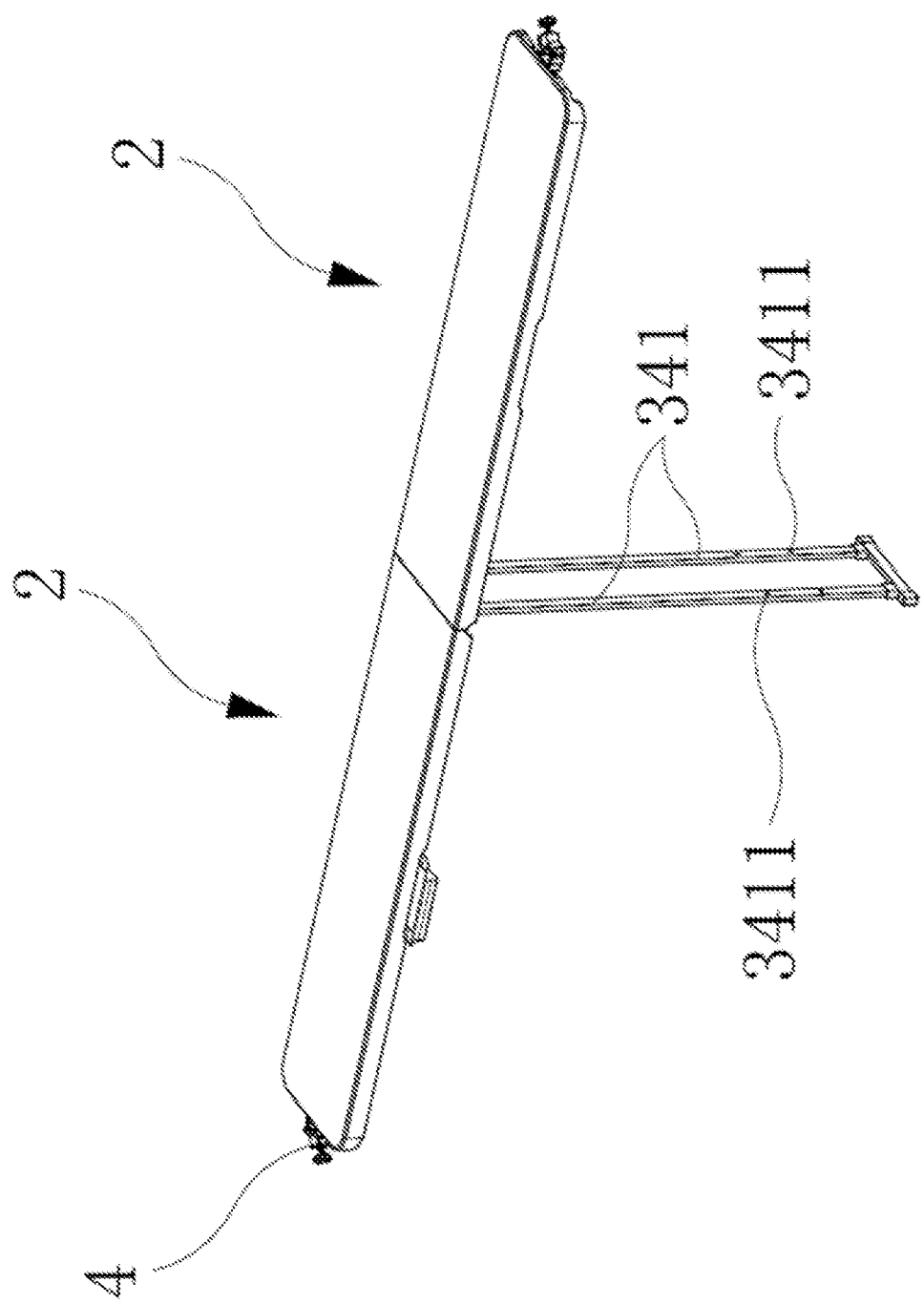
FIG. 10 is a perspective view illustrating an exemplary bar table in accordance with exemplary embodiments of the present disclosure.
Figure 11:
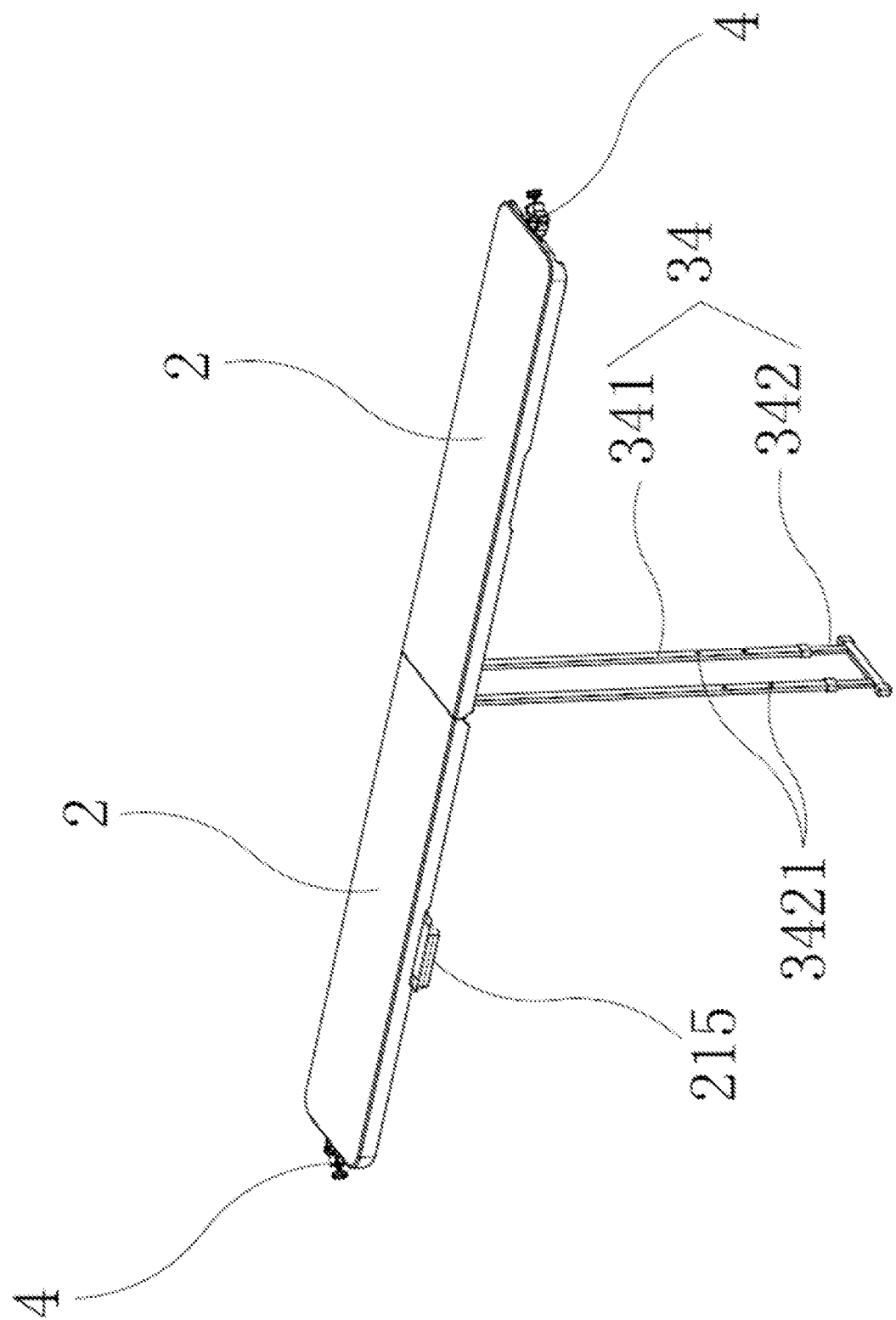
FIG. 11 is a perspective view illustrating the exemplary bar table of FIG. 10 at a different height in accordance with exemplary embodiments of the present disclosure.

Leg 31 can be adjustable or non-adjustable. For instance, in an exemplary embodiment, leg 31 includes an adjustable bar such as adjustable bar 34 illustrated in FIGS. 10 and 11. Adjustable bar 34 includes an outer bar such as outer bar 341 and an inner bar such as inner bar 342 telescopically coupled with the outer bar. Outer bar 341 includes a plurality of positioning holes such as positioning hole 3411. Inner bar 342 includes at least one elastic protrusion 3421, which pops out when passing by a positioning hole and thus locks the inner bar in position with the outer bar.

Figure 5A:
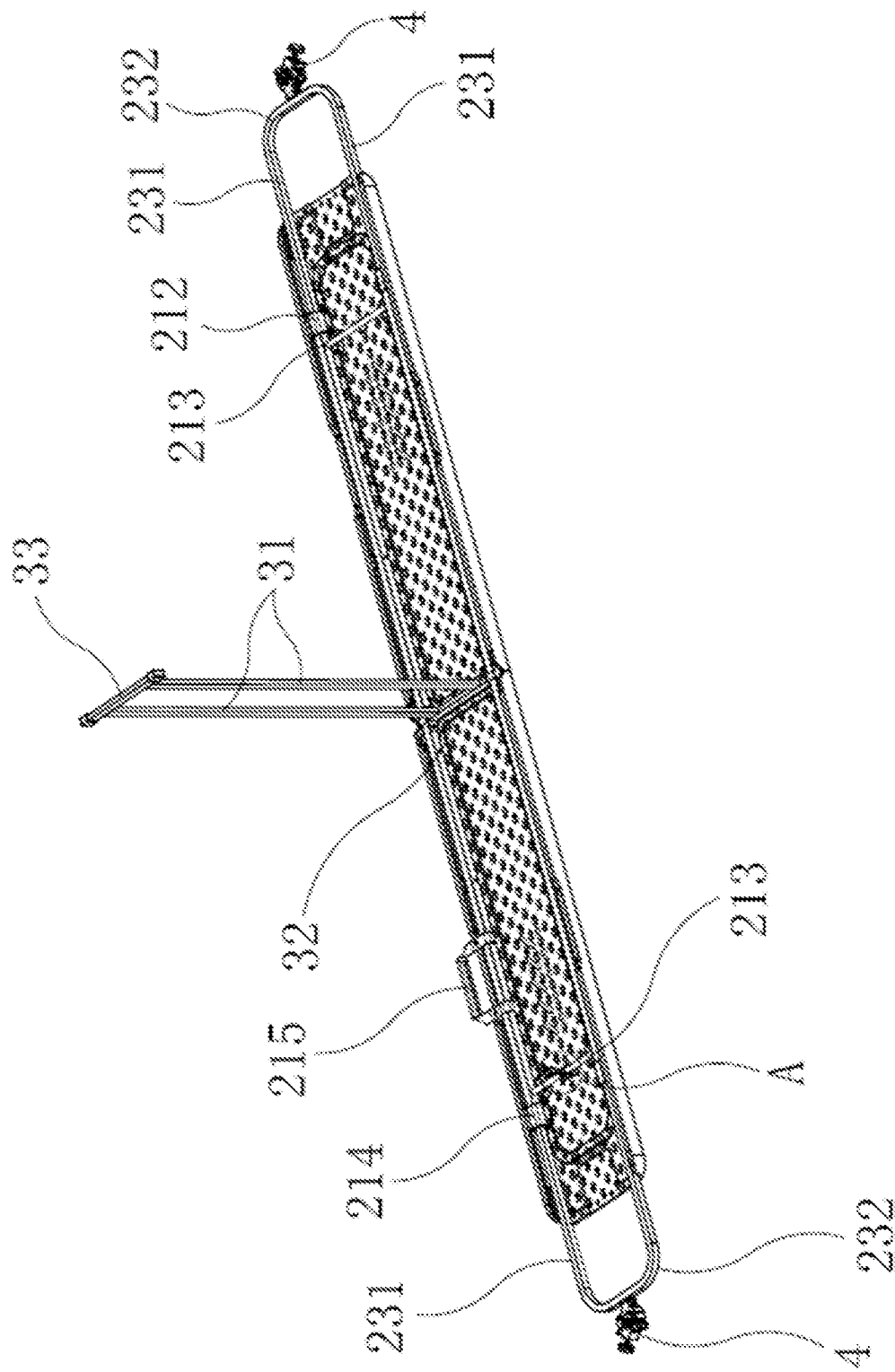
FIG. 5A is a bottom perspective view illustrating the exemplary bar table of FIG. 3 in accordance with exemplary embodiments of the present disclosure.
Figure 5B:
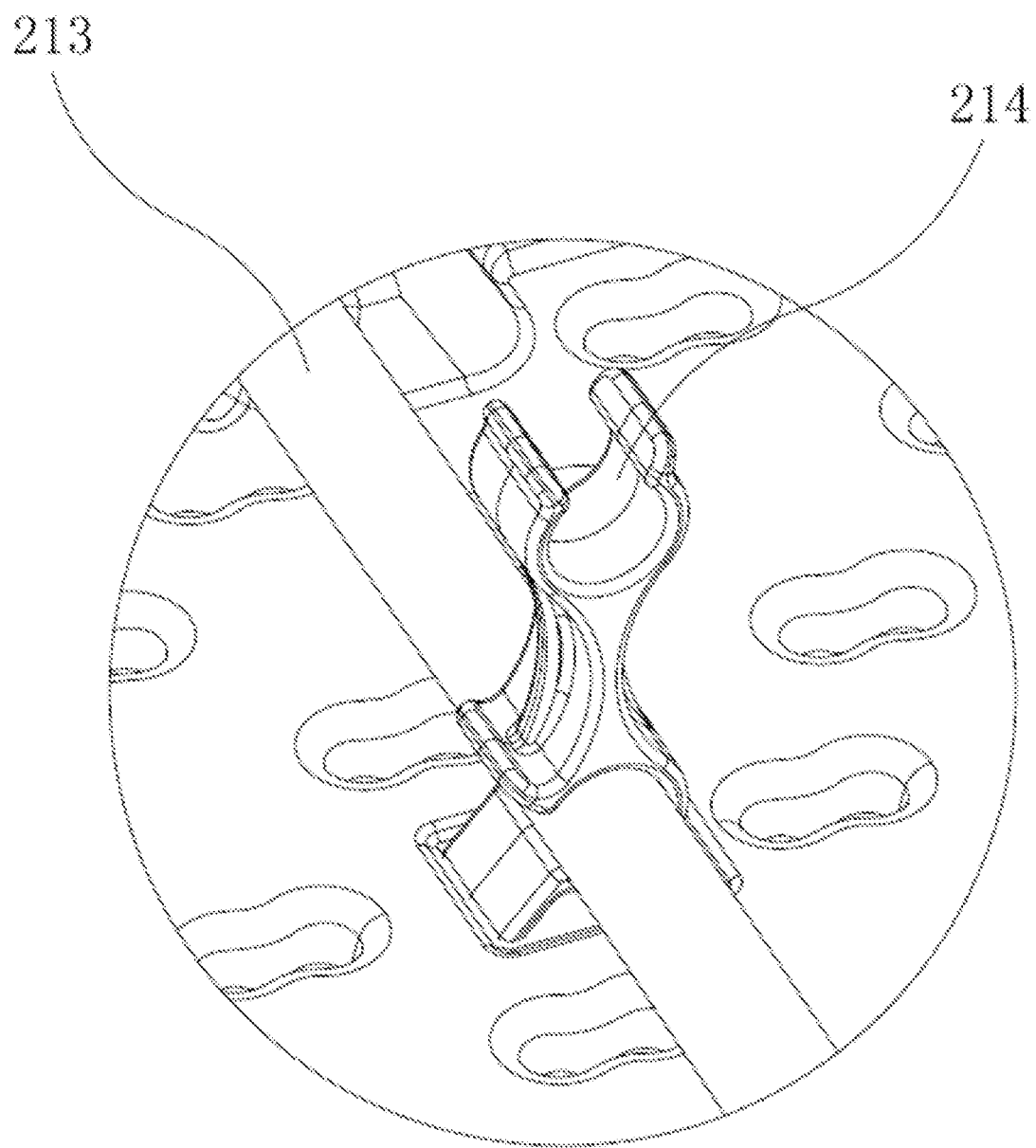
FIG. 5B is an enlarged view taken along circle A of FIG. 5A.

In some exemplary embodiments, to help maintain the folding state or to prevent accidental unfolding of the bar table, a clip is disposed at the frame of one tabletop unit and including an opening to grip cross-section-wise a bar of the frame of another tabletop unit when the bar table is folded. For instance, by way of example, FIGS. 5A and 5B illustrate clip 214 disposed at bar 213 of the frame of one tabletop unit (the tabletop unit at the left side of FIG. 5A) and including an opening to grip cross-section-wise bar 213 of the frame of another tabletop unit (the tabletop unit at the right side of FIG. 5A) when the bar table is folded. In an exemplary embodiment, bar 213 is disposed between and connected to the two bars 211 of the same frame.

Figure 8:
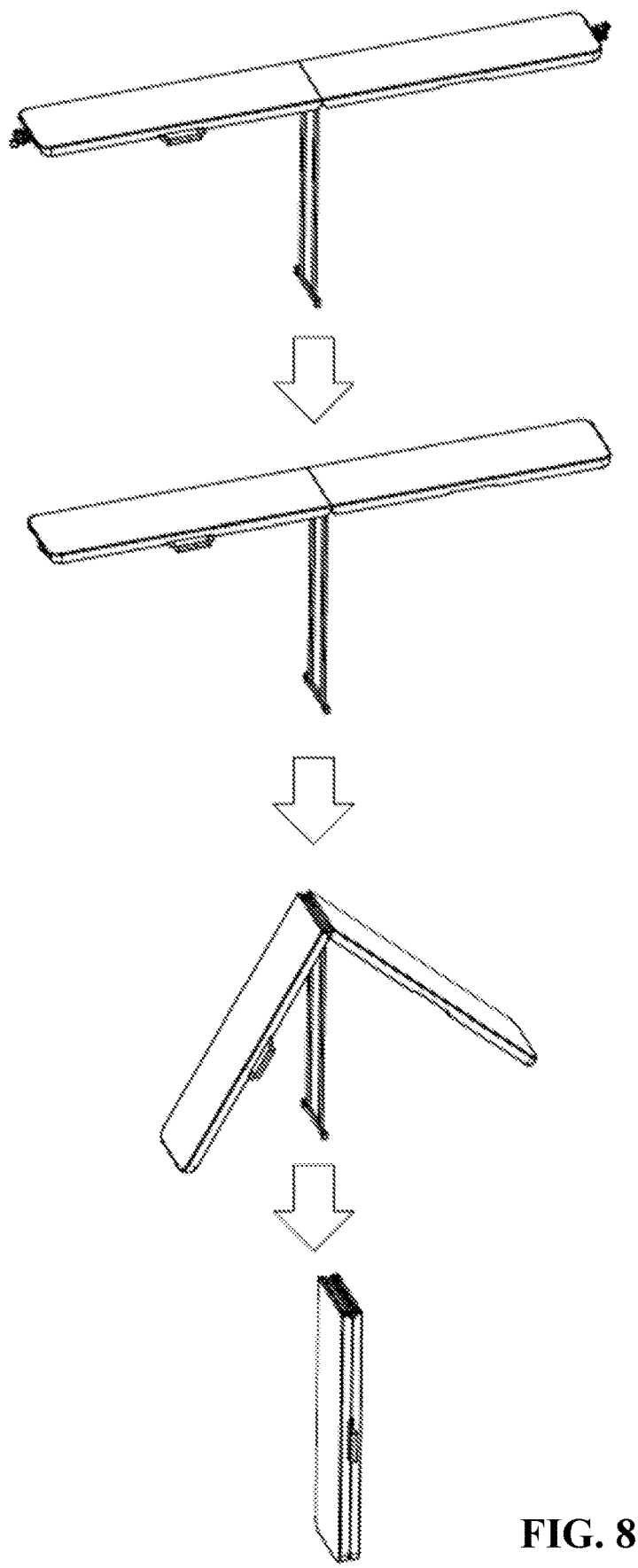
FIG. 8 is a schematic diagram illustrating an exemplary process to fold an exemplary bar table in accordance with exemplary embodiments of the present disclosure.
Figure 9:
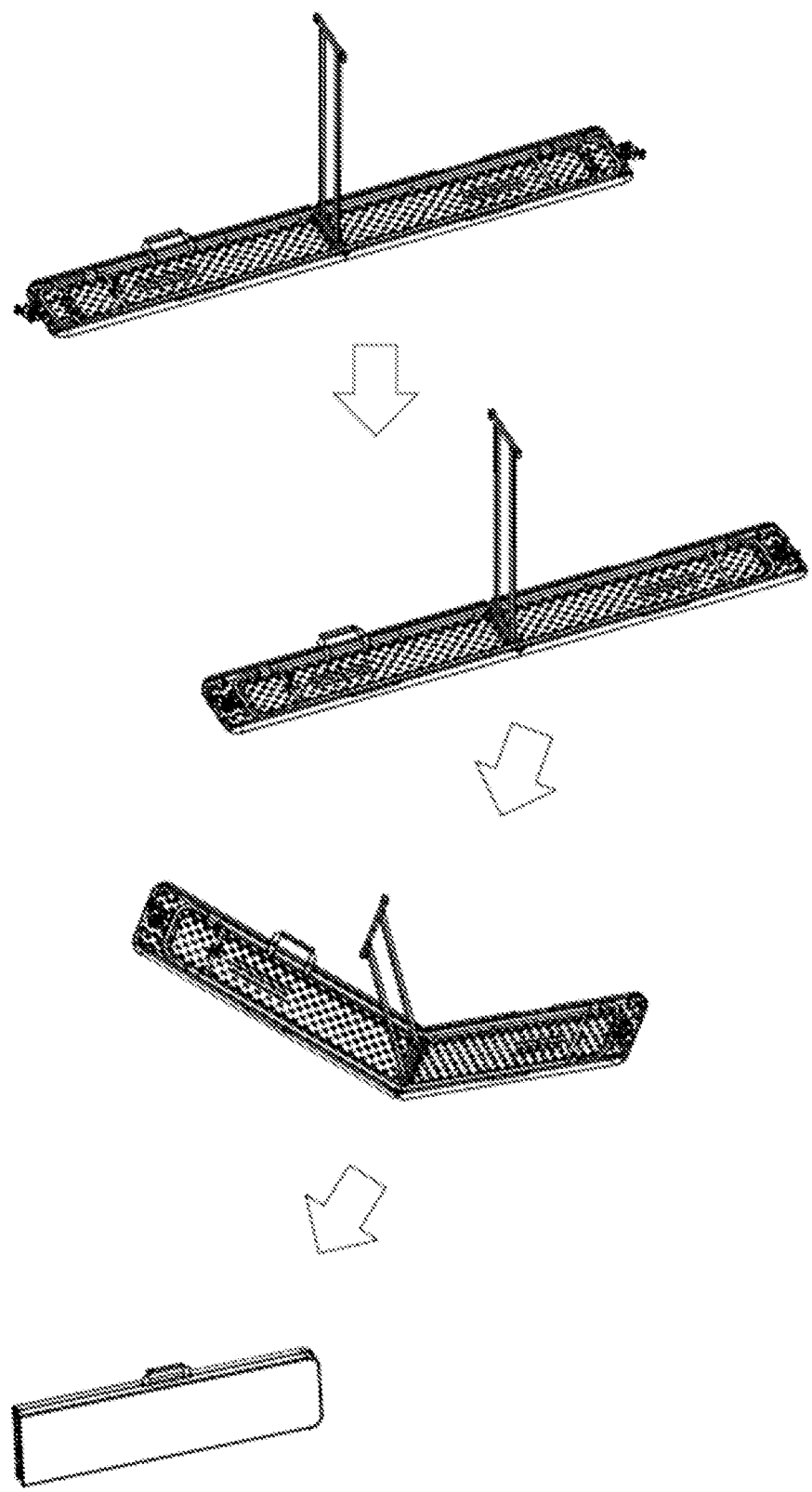
FIG. 9 is another schematic diagram illustrating an exemplary process to fold an exemplary bar table in accordance with exemplary embodiments of the present disclosure.

In some exemplary embodiments, a handle is provided for carrying the bar table. For instance, by way of example, FIGS. 5A and 8-9 illustrate handle 215 disposed at bar 211 of the frame of one tabletop unit (the tabletop unit at the left side of FIG. 5A). Handle 215 generally protrudes outside of panels 22 or is accessible from outside when the bar table is folded.

The bar table of the present invention is easy to use. For instance, to setup a bar table with two tabletop units and a leg assembly, if it is folded, then the first step is to unfold the tabletop units and the leg assembly. If the leg assembly is adjustable in height, then the leg assembly can be adjusted to place the tabletop at a desired height. If the distance between the two supporting poles intended for installing the bar table is larger than the original length of the tabletop (e.g., the length of the tabletop without extending any frame), then one or more frames can be pulled to extend the tabletop to a suitable length. After that, each connector 4 can be fastened at a supporting pole. To secure connector 4 at the supporting pole, second connecting member 44 can be locked with first connecting member 42 and, if necessarily, fastener 45 can be rotated or pushed toward the slot or enclosure of the connector to further tighten the connector at the supporting pole. This completes the setup processes.

To remove a bar table from the supporting poles, the first step is to unlock connector 4 and separate connector 4 from the supporting pole. If any frame has been extended during the installation, the frame can be pushed back to its original position. If the leg assembly has been adjusted, the leg assembly can be retracted back to its original height. Then the two tabletop units can be folded, resulting in a very compact piece as illustrated in FIGS. 8 and 9. When folded, clip 214 holds the two tabletop units together and prevents accidental unfolding of the bar table. In addition, with handle 215, the bar table is easy to carry around.

The bar tables of the present disclosure are advantageous. For instance, because of the one or more extendable frames, a bar table of the present disclosure is very flexible in use. It can be installed at various structures with supporting poles of different distances and at a structure where the distances between poles can vary, making. Moreover, with an adjustable leg assembly, a bar table of the present disclosure can be placed at different heights to meet different needs or preferences. Further, with the connectors, a bar table of the present disclosure can be easily installed at a structure (e.g., a tent) or removed from the structure. In addition, by pivotally connecting adjacent tabletop units, a bar table of the present disclosure can be folded into a compact piece and thus is convenient for storage and transportation.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "top" or "bottom", "lower" or "upper", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first connector could be termed a second connector, and, similarly, a second connector could be termed a first connector, without changing the meaning of the description, so long as all occurrences of the "first connector" are renamed consistently and all occurrences of the "second connector" are renamed consistently.

What is claimed is:

1. A bar table for installing at first and second supporting poles, the bar table comprising:
    a first tabletop unit and a second tabletop unit coupled with each other at proximal sides thereof, wherein
        the first tabletop unit comprises a first panel and a first frame coupled with the first panel;
        the second tabletop unit comprises a second panel and a second frame coupled with the second panel; and
        the first frame comprises a first mounting member coupled with the first panel, and a first extension coupled with the first mounting member and movable along a first direction to extend the first frame beyond a distal edge of the first panel;
    a leg assembly coupled with the first and second tabletop units to support the first and second tabletop units when in use;
    a first connector coupled with the first frame at a distal side of the first tabletop unit and configured to be selectively fastened at the first supporting pole; and a second connector coupled with the second frame at a distal side of the second tabletop unit and configured to be selectively fastened at the second supporting pole, wherein:

the first connector is coupled with the first extension of the first frame, thereby allowing the bar table to be installed at the first and second supporting poles of different distances;

the first connector comprises a first connecting member coupled with the first frame, and a second connecting member pivotally coupled with the first connecting member and rotatable with respect to the first connecting member in a second direction;

when the second connecting member is in a loosen state with respect to the first connecting member, the first and second connecting members collectively form an opening to allow cross-section-wise insertion of the first supporting pole into the first connector and a slot to receive cross-section-wise the first supporting pole; and when the second connecting member is in a locking state with respect to the first connecting member, the first and second connecting members collectively form an enclosure that encloses cross-section-wise the first supporting pole, wherein the enclosure comprises one or more outwardly convex corners to receive one or more corners of the first supporting pole.

2. The bar table of claim 1, wherein the second frame comprises:
a second mounting member coupled with the second panel; and
a second extension coupled with the second mounting member and movable along the first direction to extend the second frame beyond a distal edge of the second panel,
wherein the second connector is coupled with the second extension of the second frame, thereby allowing the bar table to be installed at the first and second supporting poles of different distances.

3. The bar table of claim 1, wherein the first and second supporting poles are components of a tent, an awning, a canopy, or a gazebo.

4. The bar table of claim 1, wherein the first and second tabletop units are pivotally connected to each other at proximal sides thereof and the leg assembly is pivotally connected to the first and second tabletop units at the proximal sides of the first and second tabletop units such that when folded, the leg assembly is sandwiched in between the first and second tabletop units.

5. The bar table of claim 4, further comprising a clip disposed at the first frame and comprising an opening to grip cross-section-wise a bar of the second frame when the bar table is folded.

6. The bar table of claim 1, wherein the first and second tabletop units are substantially the same.

7. The bar table of claim 1, wherein the leg assembly is adjustable in height.

8. The bar table of claim 1, wherein the first and second connectors are substantially the same.

9. The bar table of claim 1, wherein:
the first mounting member comprises first and second bars each elongated along the first direction; and
the first extension comprises a "U" shaped bar having a first side segment, a second side segment and a closed end segment connected to or integrally formed with the first and second side segments, wherein the first side segment is telescopically coupled with the first bar;
the second side segment is telescopically coupled with the second bar; and
the first connector is coupled with the closed end segment.

10. The bar table of claim 1, wherein the first connector further comprises:
a fastener coupled with the first or second connecting member and configured to prevent movement of the first supporting pole within the enclosure formed by the first and second connecting members.

11. The bar table of claim 1, wherein the second direction is perpendicular to the first direction.

12. The bar table of claim 1, wherein
one of the first and second connecting members comprises a protrusion; and
the other of the first and second connecting members comprises a buckle to engage with the protrusion, thereby locking the second connecting member with respect to the first connecting member.

13. The bar table of 1, wherein
the second connecting member comprises a protrusion; and
the first connecting member comprises:
a main body coupled with the first frame and the second connecting member; and
a buckle pivotally coupled with the main body and rotatable with respect to the main body in the second direction to engage with the protrusion of the second connecting member, thereby locking the second connecting member with respect to the first connecting member.

14. The bar table of claim 1, wherein a corner in the one or more outwardly convex corners has a substantially triangular shape.

15. The bar table of claim 1, further comprising a handle disposed at the first or second frame.

16. A bar table for installing at first and second supporting poles, the bar table comprising:
a tabletop comprising one or more tabletop units, each comprising a panel and a frame coupled with the panel, wherein the frame of a first tabletop unit in the one or more tabletop units is extendable in a first direction beyond an edge of the first panel; and
first and second connectors, each comprising a first connecting member coupled with the frame of a tabletop unit in the one or more tabletop units and a second connecting member pivotally coupled with the first connecting member and rotatable with respect to the first connecting member in a second direction,
wherein:
when the second connecting member is in a loosen state with respect to the first connecting member, the first and second connecting members collectively form an opening to allow cross-section-wise insertion of the first or second supporting pole and a slot to receive cross-section-wise the first or second supporting pole;
when the second connecting member is in a locking state with respect to the first connecting member, the first and second connecting members collectively form an enclosure that encloses cross-section-wise the first or second supporting pole, wherein the enclosure comprises one or more outwardly convex corners to receive one or more corners of the first supporting pole; and at least one of the first connecting member of the first connector and the first connecting member of the second connector is coupled with the extendable frame of the first tabletop unit, thereby allowing the bar table to be installed at the first and second supporting poles of different distances.

17. The bar table of claim 16, further comprising a leg assembly coupled with the tabletop, wherein the leg assembly is adjustable in height.

18. The bar table of claim 16, wherein a corner in the one or more outwardly convex corners has a substantially triangular shape.

19. The bar table of claim 16, wherein the first and second supporting poles are components of a tent, an awning, a canopy, or a gazebo.

20. The bar table of claim 16, wherein
the second connecting member comprises a protrusion; and
the first connecting member comprises:
  a main body coupled with the first frame and the second connecting member; and
  a buckle pivotally coupled with the main body and rotatable with respect to the main body in the second direction to engage with the protrusion of the second connecting member, thereby locking the second connecting member with respect to the first connecting member.

* * * * *